L. F. JOHNSTON.
Husking and Shelling Implement.
No. 208,178. Patented Sept. 17, 1878.
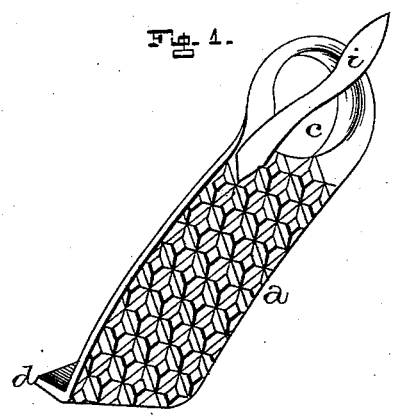
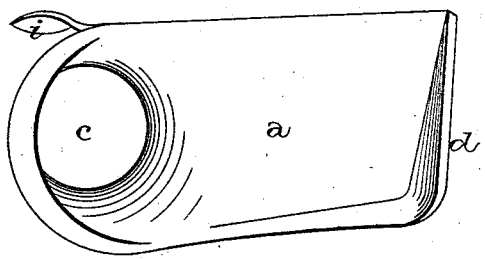
WITNESSES.
J. W. Garner
W. S. D. Haines
INVENTOR.
L. F. Johnston,
per
J. A. Lehmann,
atty.

UNITED STATES PATENT OFFICE

LARKIN F. JOHNSTON, OF POCAHONTAS, ARKANSAS.

IMPROVEMENT IN HUSKING AND SHELLING IMPLEMENTS.

Specification forming part of Letters Patent No. 208,178, dated September 17, 1878; application filed February 9, 1878.

*To all whom it may concern:*

Be it known that I, LARKIN F. JOHNSTON, of Pocahontas, in the county of Randolph and State of Arkansas, have invented certain new and useful Improvements in Corn Huskers and Shellers; and I do hereby declare the following to be a full, clear, and exact description of the invention, such as will enable others skilled in the art to which it pertains to make and use it, reference being had to the accompanying drawings, which form part of this specification.

My invention relates to an improvement in a combined corn husker and sheller; and it consists in casting the body in a single piece, having a hole through the upper end for the thumb to pass through, a flange upon its inner lower edge for the hand to rest against, a roughened surface to shell the corn with, and a horn or hook to be used in husking, all of which will be more fully described hereinafter.

The accompanying drawings represent my invention.

$a$ represents the sheller, which is cast in a single piece, having the hole $c$ through its upper end for the thumb to pass through and a flange, $d$, on the inside lower edge for the hand to bear against. The outer surface of this sheller is roughened and corrugated, or made in any other suitable way, so as to adapt it for shelling corn, while the opposite side is rounded and beveled in such a manner as to conform pleasantly to the palm of the hand.

By means of the flange on the lower side a support or rest is given for the lower edge of the hand in pressing the sheller downward over the ear, and thus prevents a constant strain from being brought upon the thumb. Where this flange is not made the whole power required for forcing the sheller back and forth comes entirely upon the joint of the thumb, and soon causes it to become sore and to tire the whole hand.

Cast with or secured to the inner edge of the sheller at the point shown is the curved prong or hook $i$, which is used in husking corn. The outer end of this prong is made sharp-pointed, so as to cut readily and easily under the husks and raise them upward sufficiently far for the hand to get a ready, easy hold upon them, and thus pull them from the ear.

It will readily be seen that the prong or hook does not in any way interfere with the shelling of the corn, and that the portion for shelling does not in the least prevent the corn from being readily husked, and by thus combining both instruments in a single piece a very handy article is produced. By making the sheller and husker in a single piece they can be very cheaply produced, will fit any hand, and will stay in position without the use of straps or other devices for fastening them.

Having thus described my invention, I claim—

A combined corn husker and sheller, consisting of the body $a$, having a roughened surface, and the hole $c$ for the passage of the thumb, and provided with the flange $d$ and husking-pin $i$, substantially as shown.

In testimony that I claim the foregoing I have hereunto set my hand this 21st day of January, 1878.

LARKIN FARLEY JOHNSTON.

Witnesses:
 WILLISTON BATES,
 ALEXANDER R. OVERBAY.